US010623917B1

(12) United States Patent
Paul

(10) Patent No.: US 10,623,917 B1
(45) Date of Patent: Apr. 14, 2020

(54) COLLABORATIVE DIGITAL STORY SYSTEM

(71) Applicant: Facebook, Inc., Menlo Park, CA (US)

(72) Inventor: Debashish Paul, Sunnvale, CA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

(21) Appl. No.: 16/154,695

(22) Filed: Oct. 8, 2018

(51) Int. Cl.
*G06F 3/0482* (2013.01)
*H04W 4/21* (2018.01)
*G06F 3/0484* (2013.01)
*G06K 9/00* (2006.01)
*G06F 16/9535* (2019.01)

(52) U.S. Cl.
CPC .......... *H04W 4/21* (2018.02); *G06F 3/04842* (2013.01); *G06F 16/9535* (2019.01); *G06K 9/00288* (2013.01)

(58) Field of Classification Search
CPC .................................................... G06F 3/0482
USPC .......................................................... 715/700
See application file for complete search history.

(56) References Cited

U.S. PATENT DOCUMENTS

| 7,810,037 | B1 * | 10/2010 | Edwards | G06Q 10/10 715/749 |
| 8,973,100 | B2 * | 3/2015 | Rubinstein | H04L 63/08 705/319 |
| 9,917,804 | B2 | 3/2018 | Valdivia et al. | |
| 10,091,318 | B2 * | 10/2018 | Modi | G06F 16/951 |
| 10,405,020 | B2 * | 9/2019 | Bruich | H04L 65/60 |
| 2007/0130164 | A1 | 6/2007 | Kembel et al. | |
| 2010/0325218 | A1 * | 12/2010 | Castro | G06Q 10/10 709/206 |
| 2013/0110885 | A1 | 5/2013 | Brundrett, III | |
| 2013/0219333 | A1 | 8/2013 | Palwe et al. | |
| 2014/0186004 | A1 * | 7/2014 | Hamer | H04N 21/21805 386/223 |
| 2014/0279068 | A1 * | 9/2014 | Systrom | G06Q 30/0277 705/14.73 |
| 2015/0058750 | A1 | 2/2015 | Chakra et al. | |
| 2016/0086019 | A1 * | 3/2016 | Ganong | G06K 9/00248 382/118 |
| 2016/0247535 | A1 * | 8/2016 | Latulipe | G06F 16/7867 |
| 2016/0292494 | A1 * | 10/2016 | Ganong | G06K 9/00288 |

(Continued)

OTHER PUBLICATIONS

Preinterview First Office Action received for U.S. Appl. No. 16/154,697 dated Nov. 21, 2019, 21 pages.

(Continued)

*Primary Examiner* — Reza Nabi
(74) *Attorney, Agent, or Firm* — FisherBroyles, LLP

(57) ABSTRACT

Systems and methods for generating digital shared story compositions may include (1) receiving, via an instance of a social media application running on a user's computing device, (i) a first user input initiating the creation of a shared story configured to include a collection of individual story compositions from different contributors and (ii) a second user input selecting one or more members of a social media platform associated with the social media application as contributors to the shared story, (2) creating the shared story with the selected members as contributors, and (3) adding, to the shared story, a digital story composition created by an additional user who was selected as a contributor via the second user input. Various other methods, systems, and computer-readable media are also disclosed.

20 Claims, 14 Drawing Sheets

(56) References Cited

U.S. PATENT DOCUMENTS

| | | |
|---|---|---|
| 2016/0364368 A1 | 12/2016 | Chen et al. |
| 2017/0085599 A1 | 3/2017 | Roche et al. |
| 2017/0149714 A1 | 5/2017 | Valdivia et al. |
| 2018/0041461 A1 | 2/2018 | Kurani |
| 2018/0046855 A1* | 2/2018 | Ganong ............. G06K 9/00248 |
| 2018/0192142 A1 | 7/2018 | Paul |
| 2018/0286097 A1* | 10/2018 | Wang ................. G06K 9/00288 |
| 2019/0130498 A1 | 5/2019 | Constantinides |
| 2019/0147017 A1 | 5/2019 | Tran |
| 2019/0166074 A1 | 5/2019 | Voss et al. |
| 2019/0197315 A1 | 6/2019 | Zhang et al. |
| 2019/0227989 A1 | 7/2019 | Keel |
| 2019/0302993 A1 | 10/2019 | Francis |

OTHER PUBLICATIONS

Preinterview First Office Action received for U.S. Appl. No. 16/154,698 dated Nov. 12, 2019, 8 pages.

Notice of Allowance received for U.S. Appl. No. 16/154,698 dated Jan. 23, 2020, 19 pages.

\* cited by examiner

COLLABORATIVE DIGITAL STORY SYSTEM

BACKGROUND

Current social media applications allow users all over the world to share their thoughts and ideas on various topics. Some social media applications allow users to create ephemeral story posts, which are accessible to other users for a limited time before disappearing from view. The ephemeral nature of the story paradigm builds excitement, by limiting a consumption experience to only current posts. This may allow a digital experience (e.g., consuming a story post relating to an event or a current thought process) to mimic a real-world experience (e.g., participating in the event or the current thought process). However, current story paradigms center around single-author compositions, making it difficult to digitally mimic the group nature inherent in many of life's real-world experiences. The instant disclosure therefore identifies a need for systems and methods for creating, managing, posting, and storing multi-author story compositions.

SUMMARY

As will be described in greater detail below, the instant disclosure describes various systems and methods for creating, maintaining, and presenting digital shared stories. In one example, a computer-implemented method may include (1) receiving, via an instance of social media application running on a user's computing device, (i) a first user input initiating the creation of a shared story configured to include individual story compositions from a group of different contributors and (ii) a second user input selecting one or more members of a social media platform associated with the social media application as contributors to the shared story, (2) creating the shared story with the selected members as contributors, and (3) adding, to the shared story, a digital story composition created by an additional user who was selected as a contributor via the second user input.

In one embodiment, the method may further include (1) providing, via a display element of the user's computing device, a composition screen that may be used to create a social media composition and (2) presenting, within the composition screen, a selectable element that may be selected to create a shared story. In this embodiment, the first user input may represent a selection of the selectable element.

In one example, the method may include, in response to receiving the first user input, (1) presenting, via a display element of the user's computing device, an inaugural landing screen for creating new shared stories, and (2) receiving the second user input via the inaugural landing screen. In this example, the inaugural landing screen may include various spaces with selectable elements (e.g., a profile picture space that allows the user to select a profile picture for the shared story, a contributor space that allows the user to select one or more members of the social media platform as contributors, a privacy space that allows the user to select a privacy setting, and a story start space that allows the user to initiate the shared story) and the method may receive the second user input via the inaugural landing screen by receiving the second user input via the contributor space.

In one example, the profile picture space may include a default profile picture and may allow the user to accept the default profile picture or select a new profile picture. In this embodiment, the default picture may represent (1) a collage of contributor pictures comprising a picture of each contributor and/or (2) an image most recently captured by a capture screen on the user's computing device prior to receiving the first user input.

In one embodiment, the method may further include using facial recognition to identify one or more users included in an image captured by a capture screen on the user's computing device prior to receiving the first user input. In this embodiment, the contributor space may provide a default list of contributors (e.g., a list of the users identified in the image).

In some examples, the privacy space may further include a binary privacy button that allows the user to toggle between two privacy settings: (1) a setting to limit access to the shared story to only contributors who have been invited to the shared story and (2) a setting to limit access to the shared story to the contributors who have been invited to the shared story and to friends of contributors who have been invited to the shared story.

In one embodiment, the method may further include presenting a contributor landing screen to the additional user via an additional instance of the social media application running on the additional user's computing device. In this embodiment, the method may further include (1) in response to receiving the second user input, transmitting a digital invitation to the additional instance of the social media application inviting the additional user to participate as a contributor to the shared story and (2) receiving, via the additional user's computing device, user input accepting the digital invitation. Additionally, the method may present the contributor landing screen by presenting the contributor landing screen in response to receiving the user input accepting the digital invitation.

In some examples, the contributor landing screen may include a group of selectable elements. These selectable elements may include, without limitation, (1) a privacy element that, when selected, allows the additional user to hide the shared story from his or her friends on the social media platform, (2) a settings element that, when selected, allows the additional user to edit one or more settings of the shared story, and/or (3) an exit element that, when selected, allows the additional user to initiate being removed as a contributor to the shared story.

In one example, the computer-implemented method may further include maintaining the shared story as a live story until a predetermined amount of time has passed without a new digital story composition being added by any of the shared story's contributors. In one embodiment, creating the shared story may include creating a shared story container to which digital story compositions created by the contributors may be added. Additionally or alternatively, creating the shared story may include publishing one or more digital story compositions of the shared story via a stories channel of the social media platform.

In some examples, the method may add the additional user's digital story composition to the shared story by (1) presenting, via a display element of the additional user's computing device, a composition screen configured for creating digital story compositions, (2) receiving digital content submitted by the additional user via the composition screen and creating the digital story composition based on the digital content, (3) additionally receiving a user selection to add the digital story composition to the shared story, and (4) adding the additional user's digital story composition to the shared story in response to receiving the user selection.

In one embodiment, a system for implementing the above-described method may include (1) a receiving module, stored in memory, that receives, via an instance of a social media application running on a user's computing device, (i) a first user input initiating the creation of a shared story configured to include individual story compositions from multiple different contributors and (ii) a second user input selecting one or more members of a social media platform associated with the social media application as contributors to the shared story. The system may also include (2) a creation module, stored in memory, that creates the shared story with the selected members as contributors, and adds, to the shared story, a digital story composition reaction by an additional user who was selected as a contributor via the second user input. The system may also include (3) a physical processor configured to execute the receiving module and the creation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, via an instance of a social media application running on a user's computing device, (i) a first user input initiating the creation of a shared story configured to include individual story compositions from a plurality of different contributors and (ii) a second user input selecting one or more members of a social media platform associated with the social media application as contributors to the shared story, (2) create the shared story with the selected members as contributors, and (3) add, to the shared story, a digital composition created by an additional user who was selected as a contributor via the second user input.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
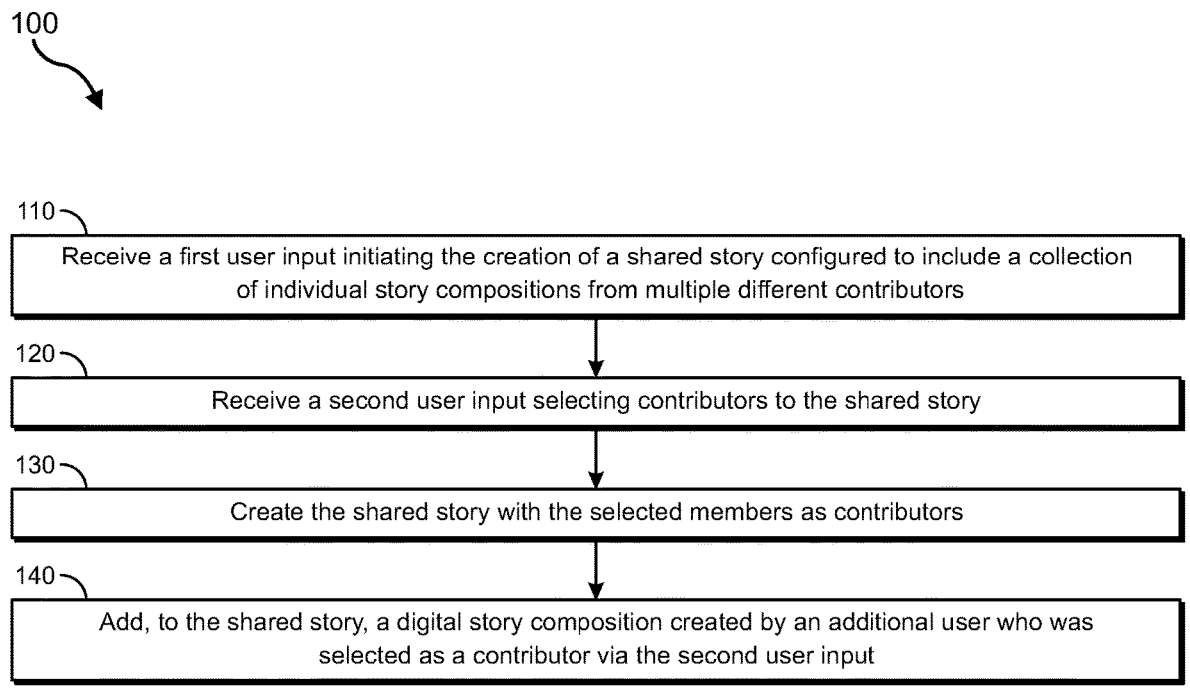
FIG. 1 is a flow diagram of an exemplary method for creating a shared story.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a collaborative digital story system that allows multiple contributors to contribute to an evolving shared story. The shared story may include a compilation of individual stories created by each of the contributors and may be ephemeral in nature, staying live as long as the authors are actively adding to the shared story.

In some examples, a shared story may be initiated using the same composition screen utilized to create a solo-author story. For example, a composition screen may include, within a cluster of push-buttons, a contributor-button that allows a producer to add contributors. When selected, the contributor-button may navigate to a shared story landing screen that allows the producer to create an identity for the shared story (e.g., by selecting contributors, a privacy setting, a title, and/or a profile picture). This process may change the story being created by the producer from a solo-author story to a shared story.

In some examples, a composition screen may take the form of a capture screen. In these examples, the capture screen may include different camera modes including a hangout mode. When a user selects the hangout mode prior to taking a picture, the capture screen may automatically navigate to the shared story landing screen after the picture is taken. In these examples, the shared story landing screen may automatically (1) select the picture taken via the capture screen as a profile picture, (2) use facial recognition to identify one or more users in the picture, and (3) select the identified users as contributors.

After being added as a contributor, a contributor may be presented with a contributor landing screen that allows the contributor to initiate several actions. For example, the contributor landing screen may allow the contributor to hide the shared stories from his or her contacts, edit the shared story settings, and/or leave the shared story.

The shared story may be posted to a stories consumption channel (i.e., become "live") once the first individual story (e.g., the producer's original story) is added to the shared story. Then, the shared story may continue to update with additional individual stories as they are added. In some examples, the shared story may remain live as long as additional stories continue to be added. For example, the shared story may remain live until the last added story becomes older than 24 hours. In one example, all the individual stories added by the contributors may be added to an archive as they expire, which may be accessed by each of the contributors but inaccessible to non-contributors.

As will be explained in greater detail below, embodiments of the instant disclosure may provide an easier means of sharing group content and interacting with that group content. In traditional social media applications, stories are created using a single-author paradigm, in which stories are organized by user (e.g., where stories by a same user are grouped together and designated by the user's name). However, the traditional single-author paradigm does not provide a structure to organize ephemeral content based on a group, event, and/or idea, making it nearly impossible to digitally mimic the group nature inherent in many of life's real-world experiences.

The embodiments herein, by contrast, enable a group of users to create a shared story that includes a collection of stories with content that is relevant to the group (e.g., stories relating to a family vacation). Thus, a user interested in accessing content that is relevant to the group, may access all of the content (e.g., all stories relating to the family vacation) in one logical space, instead of attempting to access such content spread out across multiple different logical spaces (e.g., spread out across the logical spaces of multiple users). This may improve the functioning of a computer itself by improving the computer's ability to meaningfully organize data. This may also improve the functioning of a computer itself by reducing the number of actions that must be received by the computer from a user attempting to access group-relevant data.

The following will provide, with reference to FIG. 1, detailed descriptions of computer-implemented methods for digitally creating shared stories. Detailed descriptions of corresponding example systems will also be provided in connection with FIG. 2. In addition, detailed descriptions of a corresponding creation flow will be provided in connection with FIGS. 3-7. Then, the following will provide, with reference to FIG. 8, detailed descriptions of computer-implemented methods for adding a digital story composition to a shared story. Detailed descriptions of corresponding example systems will also be provided in connection with FIG. 9. In addition, detailed descriptions of corresponding creation flow will be provided in connection with FIGS. 10-14. Thus, FIGS. 1-7 relate to methods and systems utilized by a producer of the shared story (i.e., who initiates the creation of the shared story) and FIGS. 8-14 relate to methods and systems utilized by contributors to the shared story (e.g., users invited to contribute to the shared story by the producer).

FIG. 1 is a flow diagram of an exemplary computer-implemented method 100 for creating shared stories and adding contributor compositions to the shared story. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a user device 202 as shown in exemplary system 200 in FIG. 2.

Figure 2:
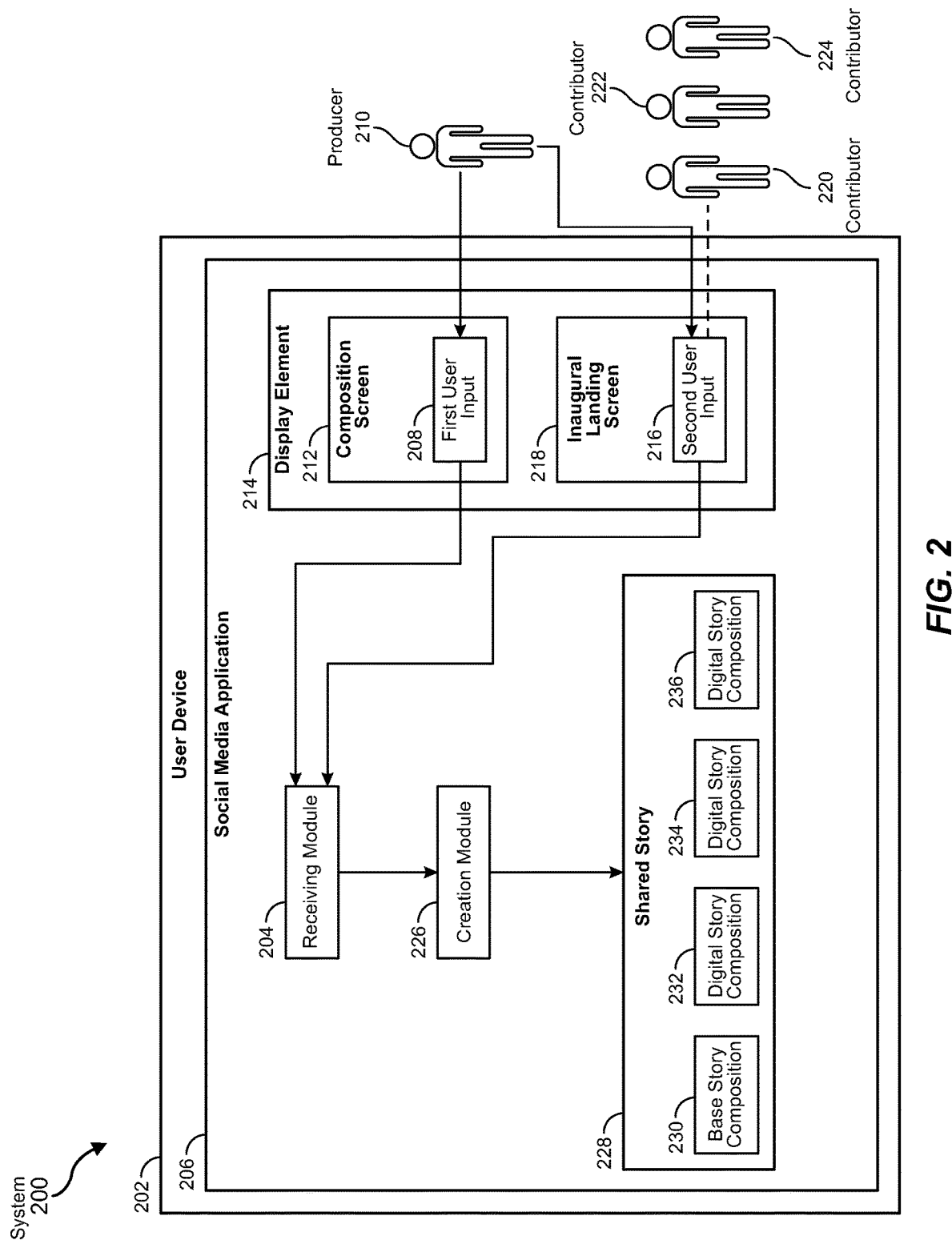
FIG. 2 is a block diagram of an exemplary shared story system.

As illustrated in FIG. 1, at step 110, one or more of the systems described herein may receive, via an instance of a social media application running on a user's computing device, a first user input initiating the creation of a shared story configured to include a collection of individual story compositions from multiple different contributors. For example, as illustrated in FIG. 2, a receiving module 204 may receive, via social media application 206 running on user device 202, a first user input 208 from a producer 210 that initiates the creation of a shared story.

User device 202 generally represents any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user of user device 202 (i.e., producer 210) may have a user account with a social-networking platform and may have an instance of a social media application managed by the social-networking platform and associated with the user's account installed on user device 202 (i.e., social media application 206).

The term "social media application" as used herein refers to any type or form of computer program managed by a social media platform that is installed and executed on a user device to cause the user device to perform useful tasks. In some examples, the social media application may include both a composition functionality and a consumption functionality. The composition functionality may be used to create digital social media compositions to share with other users of the social media platform (e.g., digital newsfeed compositions and/or digital story compositions). The consumption functionality may be used to view user compositions created by other users (e.g., via a newsfeed consumption channel and/or stories consumption channel presented via one or more graphical user interfaces of the social media application).

As used herein, the term "stories consumption channel" generally refers to any type or form of social media consumption channel that presents a continuous series of story compositions to a composition-consumer, one by one. In one example, the stories consumption channel may transition from presenting one story composition to the next automatically, without requiring any user input to do so. In some examples, a story composition may only be viewable for a predetermined amount of time. For example, a story composition may be set to disappear after twenty-four hours. In addition to presenting story compositions created by a solo-author, the stories consumption channel may be configured to present shared stories created by a group of authors, as will be discussed in greater detail below.

The term "story composition" as used herein generally refers to any type or form of social media composition intended for a stories consumption channel. The story composition may include a variety of content (e.g., a digital photograph, a digital video, a gif, text, a link, etc.). In some examples, a story composition may include multiple posts, each of which includes different content. In one such example, the story composition may include a text-based cover card that is displayed for a predetermined amount of time followed by each post, one by one, each of which may be displayed for a subsequent predetermined amount of time.

The term "shared story" as used herein generally refers to a collection of individual stories created by multiple different contributors that are stored in the same stories container and posted as a group (e.g., one after the other in a series) in a stories consumption channel. In some examples, a shared story may be organized around an event (e.g., a family vacation, a field trip, a campaign rally, etc.). In additional or alternative examples, a shared story may be organized around a theme (e.g., karaoke compositions of songs). In some examples, the rights to contribute to a shared story may be limited to a group of users invited to contribute to the shared story (e.g., by a producer of the shared story). Additionally, the rights to view a shared story may be limited based on a privacy setting selected by the producer and/or a contributor to the shared story. To give a specific example, the shared story may only be displayed in the stories consumption channels of the contributors. Alternatively, the share story may only be displayed in the stories consumption channels of the contributors and in the stories consumption channels of the contributors' friends.

Receiving module 204 may receive first user input 208 in a variety of contexts. In some examples, first user input 208 may be submitted to a composition screen 212, presented to producer 210 via a display element 214 of user device 202 as part of a story creation process.

The term "composition screen" as used herein generally refers to any type or form of user interface presented via a social media application that facilitates the creation of a social media composition. In some examples, the composition screen may be configured to receive user-generated text and/or digital media (e.g., a digital photograph, a digital video, and/or a graphic) submitted via user input for inclusion in a social media composition. Additionally, the composition screen may allow a user to manipulate text and/or media. For example, the composition screen may allow a font, background, and/or text size to be manipulated for text submitted to the composition screen. As another example, the composition screen may be configured to receive a selection and/or placement of metadata items pertaining to the composition (e.g., a digital location sticker, a digital feelings sticker, a digital paint submission, a media filter, etc.). In one embodiment, a story composition being composed via composition screen 212 may form the basis of the shared story initiated by first user input 208 (e.g., by becoming an initial story in the shared story and/or a profile picture for the shared story).

Figure 3:
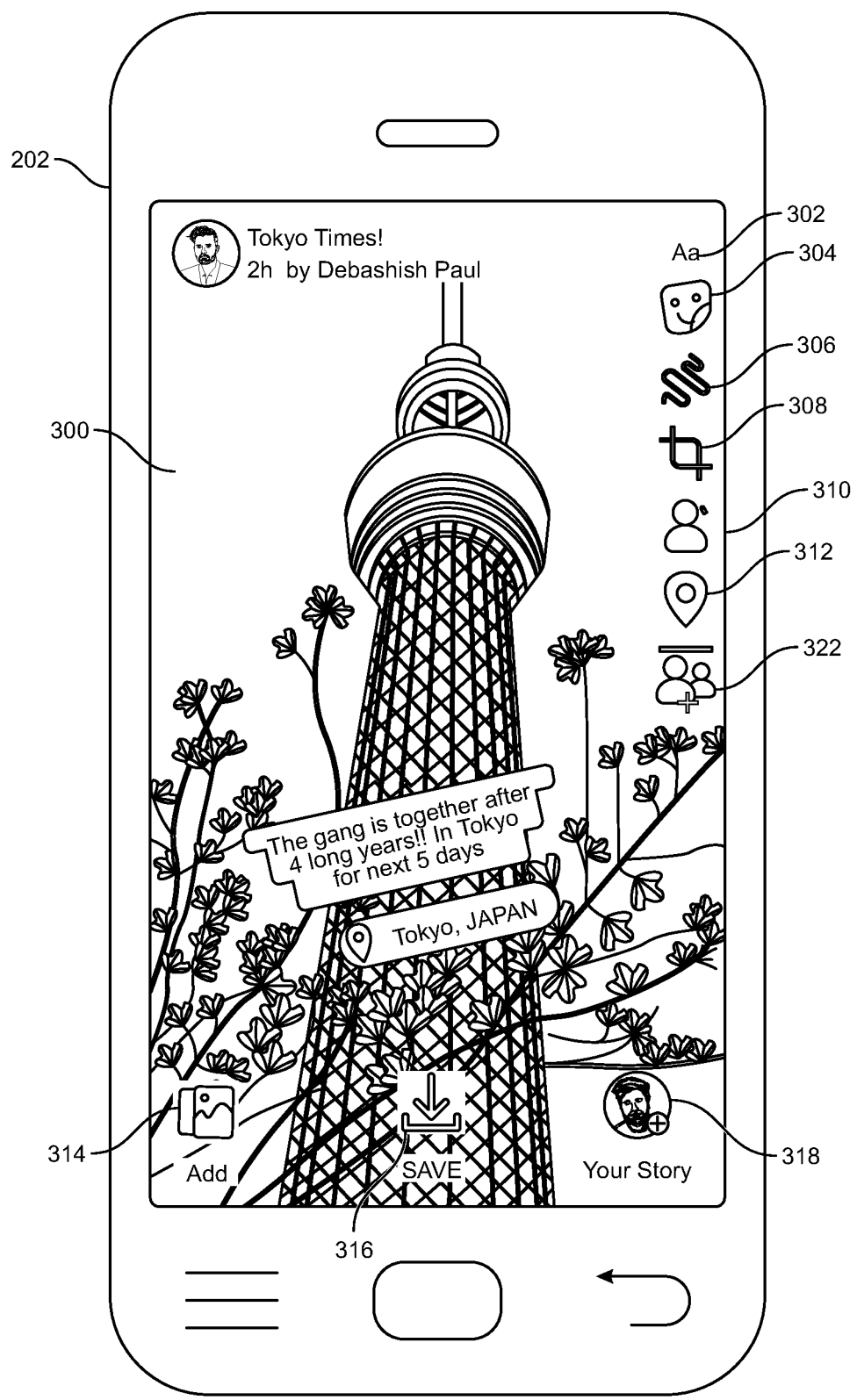
FIG. 3 is an illustration of an exemplary composition screen 300 with an exemplary element that trigger the creation of a shared story.

FIG. 3 provides a specific example of a composition screen (i.e., composition screen 300) from which first user input 208 may be received. As shown in FIG. 3, composition screen 300 may include a group of push buttons configured to perform various tasks related to creating a social media composition (e.g., a text button 302 for adding text to the composition, a metadata button 304 for adding metadata items in the form of digital stickers to the composition, a paint button 306 for digitally drawing on the composition, a crop button 308 for cropping digital media items that form the basis of the composition, a tag button 310 for tagging friends in the composition, a location button 312 for adding location information to the composition, a camera roll button 314 for adding additional digital media items from a camera roll of user device 202 to the composition, a save button 316 for saving the composition, and a creation button 318 for adding the composition to an individual story channel of producer 210).

Composition screen 300 as depicted in FIG. 3 represents one of a series of screens presented during the composition process (i.e., as part of a creation flow). As part of this creation flow, producer 210 may have selected the image displayed via composition screen 300 from a previous screen (e.g., a composition landing screen similar to the contributor composition screen described in greater detail below in connection with FIG. 10). Additionally, one or more subsequent screens may be presented to add additional content to a composition (e.g. in response to a selection of camera roll button 314) or to add text or digital metadata stickers to the composition (e.g., in response to a selection of text button 302 and/or metadata button 304).

In some examples, as illustrated in FIG. 3, composition screen 300 may include a contributor button 322 that may be used to add contributors to the composition being created via composition screen 300, triggering the creation of a shared story. In this example, first user input 208 may represent a selection of contributor button 322.

Returning to FIG. 2, in another example, composition screen 212 may represent a capture screen from which first user input 208 is received. The term "capture screen" as used herein generally refers to any type or form of composition screen with a capture element that allows a user to take a digital photo and/or digital video with a digital camera embedded within a user device displaying the capture screen (e.g., by selecting a capture push button within the capture screen).

Figure 4:
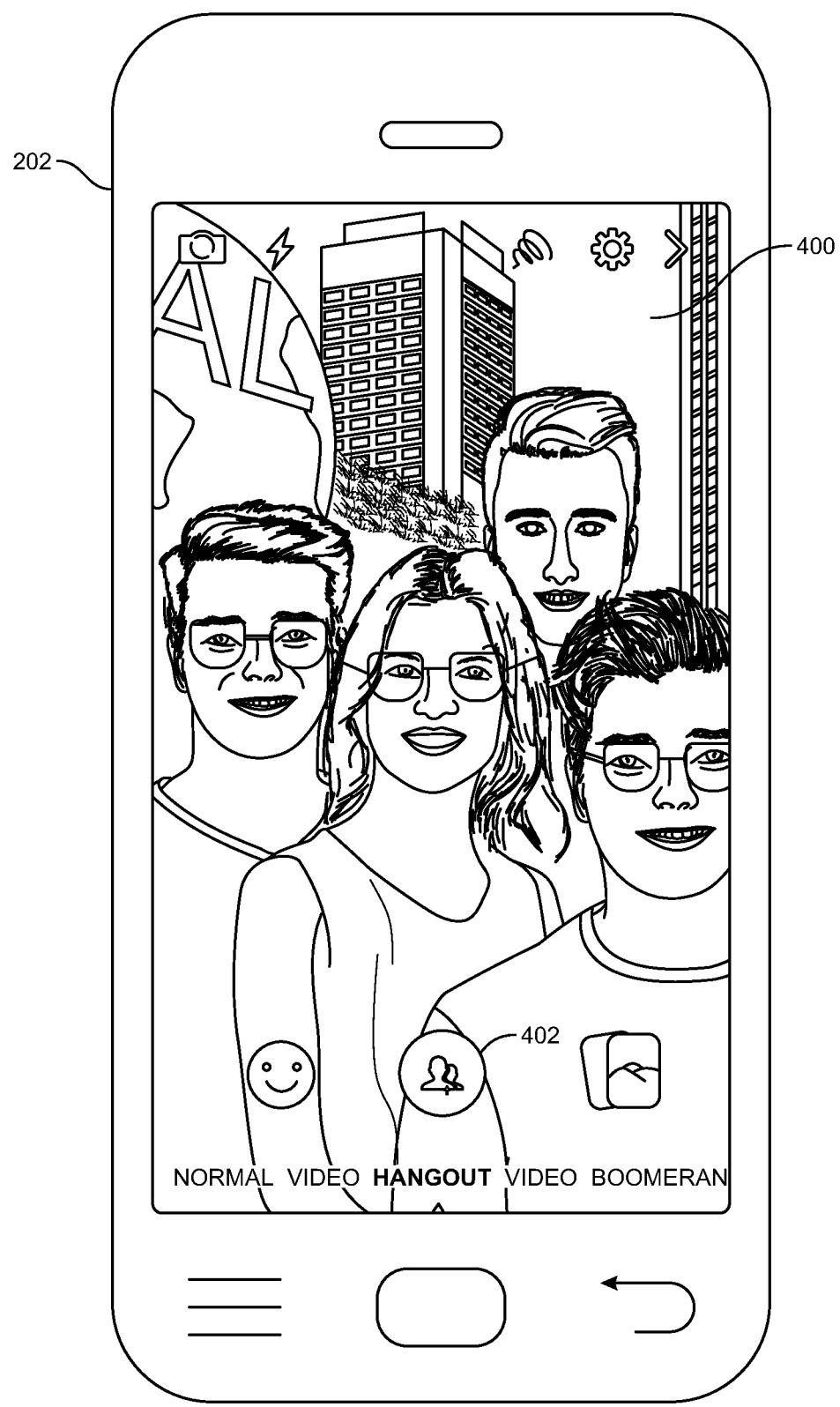
FIG. 4 is an illustration of an exemplary capture screen with an exemplary element that triggers the creation of a shared story.

FIG. 4 provides a specific example of a capture screen (i.e., capture screen 400) from which first user input 208 may be received. As shown in FIG. 4, capture screen 400 may include a variety of push buttons associated with different modes for recording a digital video or digital image (e.g., a normal video mode, a boomerang video mode in which a digital video loop is created, a slow-motion mode, etc.). These push buttons may include a push button (e.g., hangout button 402 in FIG. 4) associated with the group mode. By selecting the group mode push button (i.e., hangout button 402), the user may initiate a shared story that uses the photograph and/or video being taken by the capture screen as the basis of the shared story. In some examples (e.g., the example illustrated in FIG. 4), hangout button 402 may represent a capture button that both initiates a camera embedded in user device 202 to capture an event and causes the event to be captured in the hangout mode.

In some examples, a creation flow may include first presenting a capture screen, such as capture screen 400 illustrated in FIG. 4, and then presenting a composition screen, such as the composition screen illustrated in FIG. 3, that includes an image captured using the capture screen. In this example, a producer may have two opportunities to submit user input initiating the creation of the shared story (i.e., by selecting a push button such as hangout button 402 in FIG. 4 or by selecting a push button such as contributor button 322 in FIG. 3).

Returning to FIG. 1, at step 120, one or more of the systems described herein may receive, via the instance of the social media application running on the user's computing device, a second user input selecting one or more members of a social media platform associated with the social media application as contributors to the shared story. For example, as illustrated in FIG. 2, receiving module 204 may receive, via social media application 206, a second user input 216 from producer 210 selecting contributors 220, 222, and 224.

Receiving module 204 may receive second user input 216 in a variety of contexts. In some examples, an inaugural landing screen 218 for creating new shared stories may be presented via display element 214 by a display module of social media application 206 (e.g., in response to receiving module 204 receiving first user input 208). In these examples, receiving module 204 may receive second user input 216 from inaugural landing screen 218.

Figure 5A:
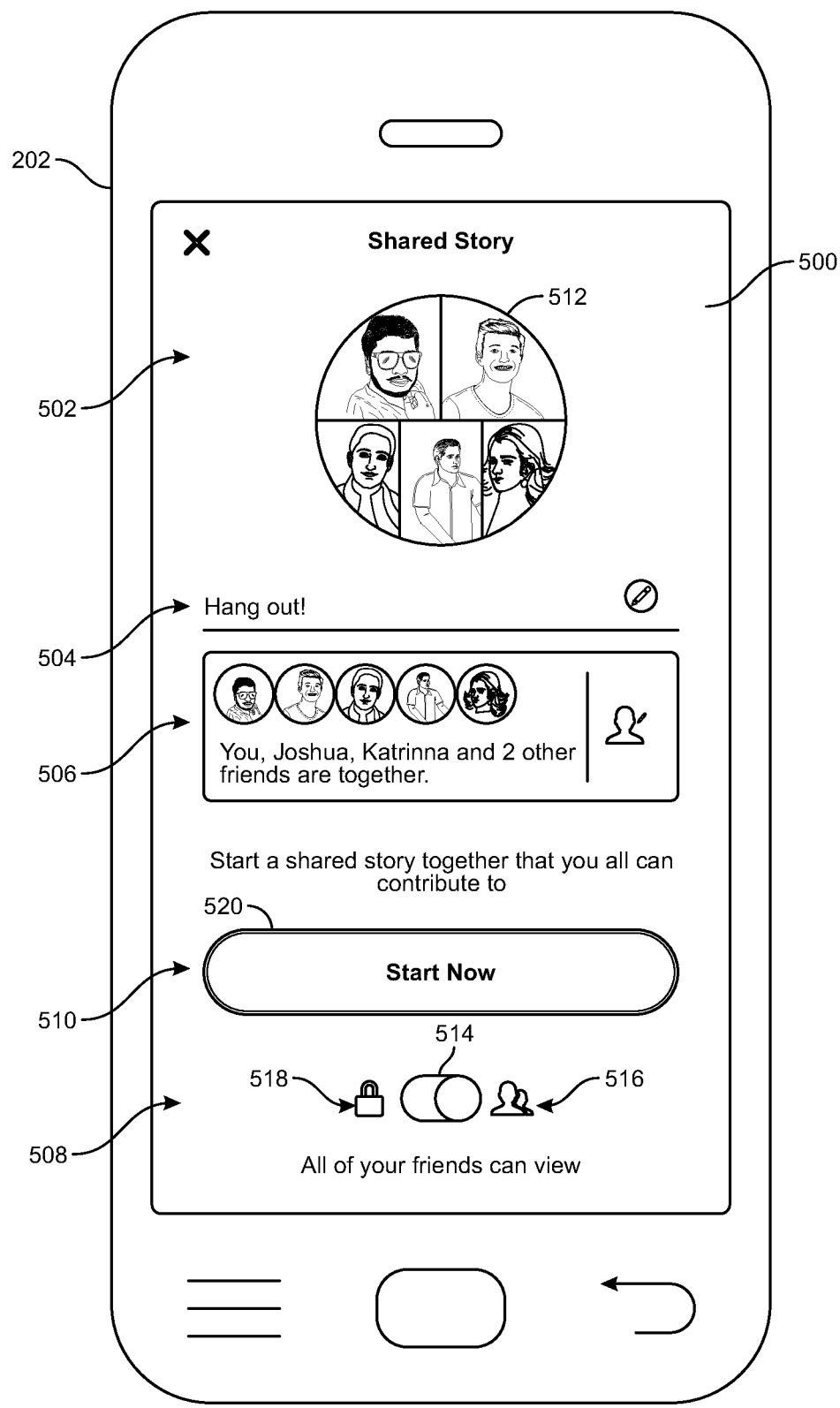
FIGS. 5A-5B are an illustration of an additional exemplary inaugural landing screen for creating a shared story that toggles between two different privacy settings.

Inaugural landing screen 218 may be configured with a variety of spaces that include selectable elements for creating a shared story, as illustrated in FIG. 5A. FIG. 5A includes an exemplary embodiment of an inaugural landing screen (i.e., inaugural landing screen 500) with multiple spaces: (1) a profile picture space 502, (2) a story name space 504, (3) a contributor space 506, (4) a privacy space 508, and (5) a story start space 510. A functionality and/or configuration of each of these spaces will be discussed, in turn.

First, profile picture space 502 may allow producer 210 to select a profile picture for the shared story being created via inaugural landing screen 218. In one example, profile picture space 502 may display a default profile picture (such as default profile picture 512). In this example, profile picture space 502 may allow producer 210 to accept the default profile picture or to select a new profile picture (e.g., from a photo database maintained by user device 202). In some examples, the default profile picture may include a collage of the profile pictures of one or more of the contributors to the shared story, as shown in FIG. 5A. In another example, the default profile picture may represent an image most recently captured by a capture screen on user device 202 (e.g., prior to receiving module 204 receiving first user input 208). For example, the default profile picture may represent an image captured by capture screen 400 displayed in FIG. 4 or composition screen 300 displayed in FIG. 3.

Figure 5B:
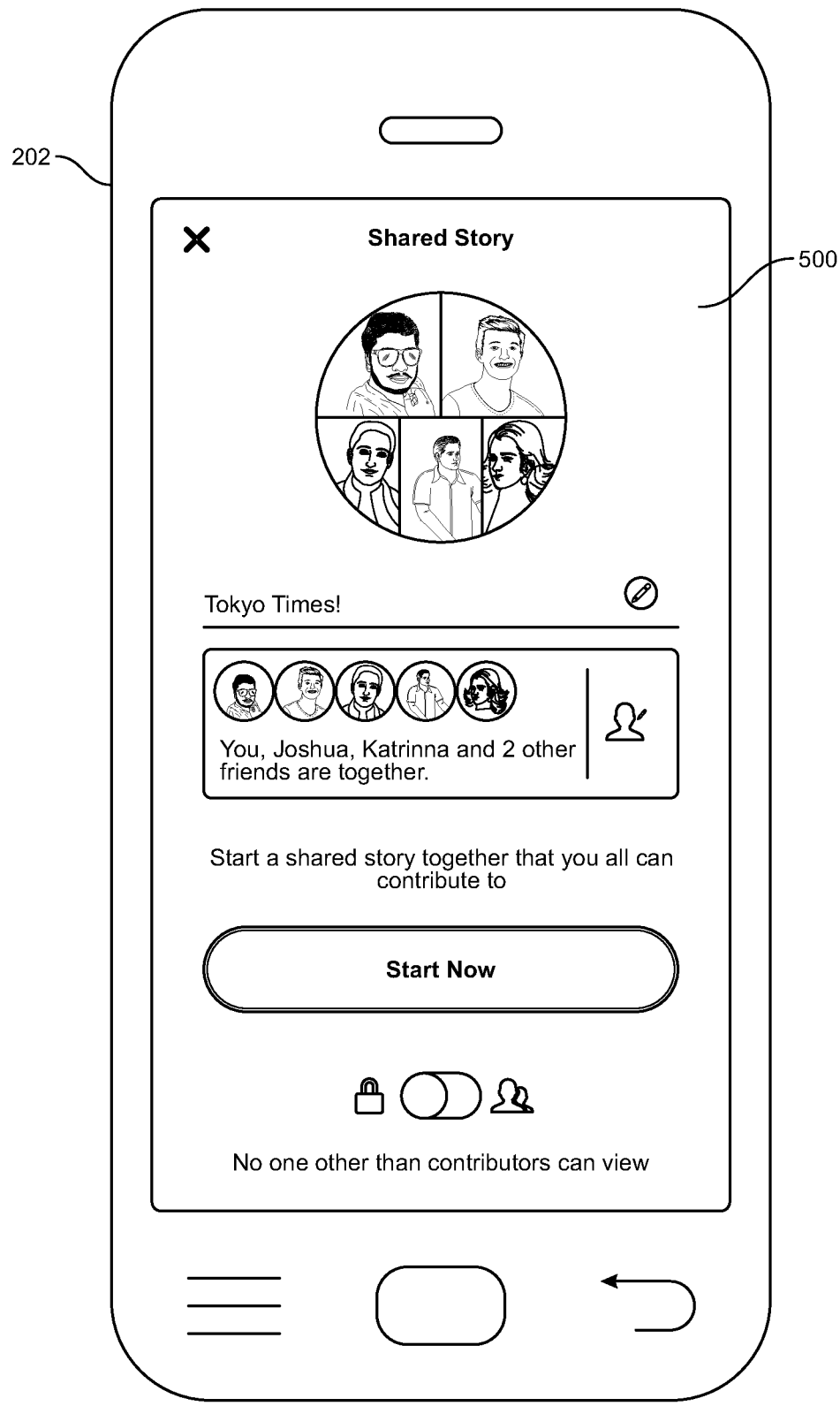
Figure 6:
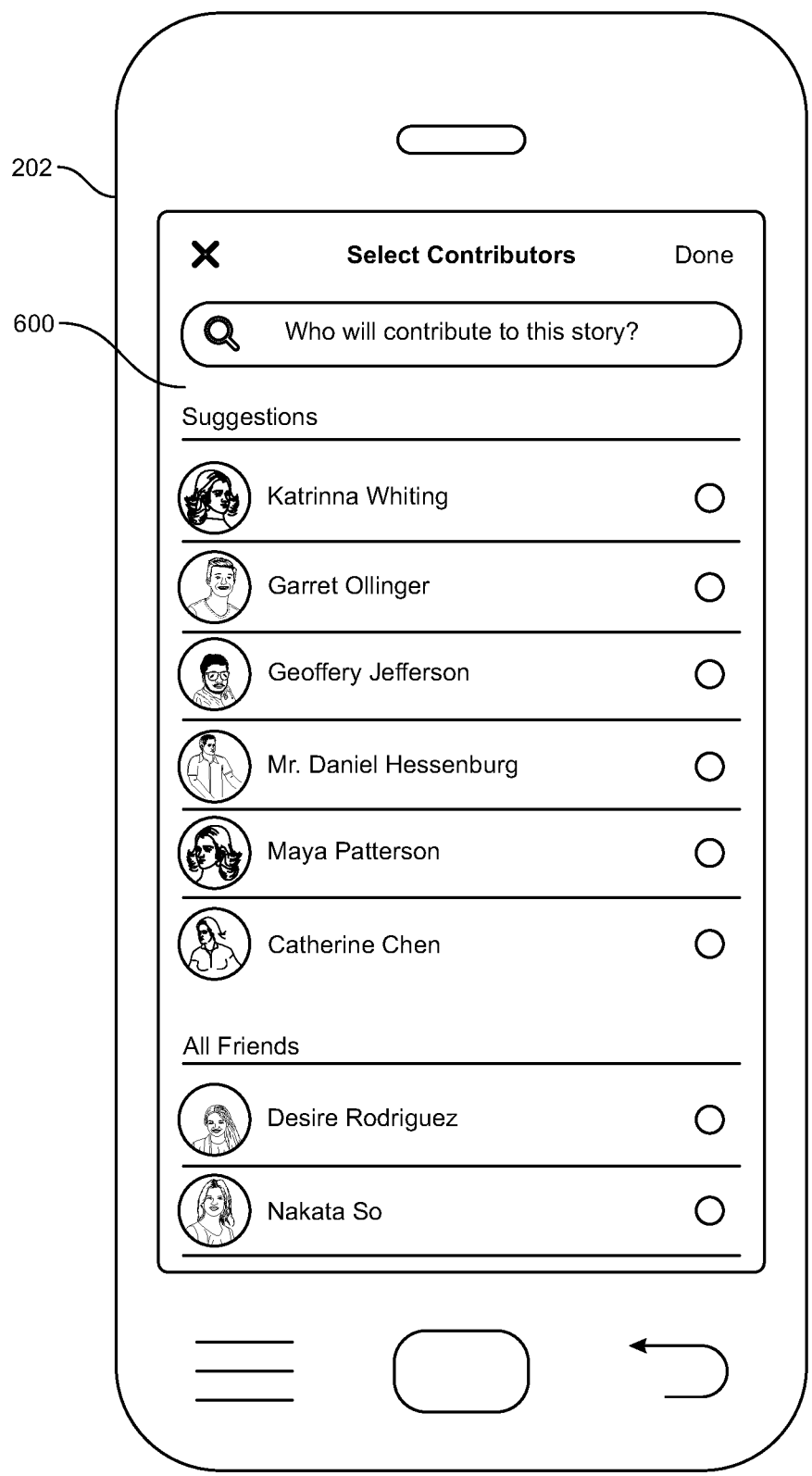
FIG. 6 is an illustration of an exemplary contributor selection screen displayed as part of a shared story creation process.

Second, story name space 504 may include a text box through which producer 210 may input a name for the shared story. For example, as illustrated in FIG. 5B, producer 210 may input the name "Tokyo Times!" In some examples, story name space 504 may display a default name predicted (using a prediction module) based on context available to user device 202. For example, the prediction module may predict the name based on a current location indicated by a location sensor within user device 202. In this example, the default name may include the name of a country, city, restaurant, etc. As another example, the prediction module may predict the name based on an entry in a digital calendar maintained by social media application 206 and/or user device 202. In this example, the default name may include the name of an event identified in the digital calendar.

Third, contributor space 506 may allow producer 210 to select one or more members of the social media platform associated with social media application 206 as contributors to the shared story. In some examples, the disclosed systems and methods may (using a prediction module) predict a list of users that producer 210 may wish to add as contributors to the shared story and may automatically display the predicted list of users in contributor space 506. In these examples, contributor space 506 may be configured to allow producer 210 to accept and/or modify the automatically/ predictively selected contributors. In one embodiment, an additional contributor screen (e.g., such as contributor screen 600 displayed in FIG. 6) may be displayed in response to producer 210 selecting contributor space 506.

The prediction module may predict the list of users in a variety of ways. In some examples, the prediction module may have identified the users in a digital photograph and/or video using facial recognition. For example, in examples in which first user input 208 was received from a capture screen (such as capture screen 400 in FIG. 4), the prediction module may have identified the users within a digital photograph being taken via the capture screen and may have automatically populated contributor space 506 with the identified users.

Fourth, privacy space 508 may allow producer 210 to select a privacy setting for the shared story. In some examples, privacy space 508 may include a binary privacy button 514 that allows producer 210 to toggle between two privacy settings. For example, as illustrated in FIGS. 5A and 5B, privacy space 508 may allow producer 210 to toggle between an open setting 516 (selected by default in FIG. 5A), in which contributors and friends of each of the contributors are permitted to view the shared story, and a closed setting 518 (selected by producer 210 in FIG. 5B), in which only contributors are permitted to view the shared story.

Finally, story start space 510 may include a start button 520 configured to initiate the creation of the shared story when selected via user input. Start button 520 may initiate the creation of the shared story by inviting the selected users to be contributors and/or by making the shared story live.

Returning to FIG. 1, at step 130, one or more of the systems described herein may create the shared story with the selected members as contributors. For example, as illustrated in FIG. 2, a creation module 226 may create a shared story 228 with contributors 220, 222, and 224 as contributors.

Creation module 226 may create shared story 228 in response to a variety of triggers. In some examples, creation module 226 may create shared story 228 in response to receiving module 204 receiving a user input to inaugural landing screen 218. Using the inaugural landing screen depicted in FIG. 5 as a specific example, creation module 226 may create shared story 228 in response to receiving module 204 receiving user input selecting start button 520. In other examples, creation module 226 may create shared story 228 in response to receiving first user input 208 or second user input 216 (e.g., without first presenting inaugural landing screen to producer 210).

Creation module 226 may create shared story 228 in a variety of ways. In some examples, creation module 226 may create shared story 228 by creating a shared story container to which digital story compositions created by contributors 220, 222, and 224 may be added. Additionally or alternatively, creation module 226 may create shared story 228 by publishing shared story 228 via a stories consumption channel (e.g., by publishing a base story composition 230 created by producer 210 as part of a shared story creation process to which subsequently created compositions by the producer and/or contributors may be added).

The audience to which shared story 228 is published may depend on a privacy setting (e.g., selected from inaugural landing screen 218). For example, if producer 210 selected a private privacy setting to only share shared story 228 with contributors to the shared story, shared story 228 may only be published to stories consumption channels of the contributors. Alternatively, if producer 210 selected a public privacy setting to share shared story 228 with both contributors and friends of the contributors, shared story 228 may be published to the stories consumption channels of the contributors and to the stories consumption channels of the contributors' friends.

Returning to FIG. 1, at step 140 or more of the systems described herein may add, to the shared story, a digital story composition created by an additional user who was selected as a contributor via the second user input. For example, as illustrated in FIG. 2, creation module 226 may add story compositions 232-236 (created by contributors 220-224) to shared story 228.

Creation module 226 may add story compositions 232-236 to shared story 228 in a variety of ways. In some examples, creation module 226 may add story compositions 232-236 to a shared story container created for shared story 228. Additionally or alternatively, creation module 226 may publish story compositions 232-236 as part of shared story 228 via a stories channel. In these examples, each published story composition may include a caption that includes the name of the shared story and the author of the particular story. Additionally, the published story compositions may be displayed in stories consumption channels as a series, one after the other.

Figure 7:
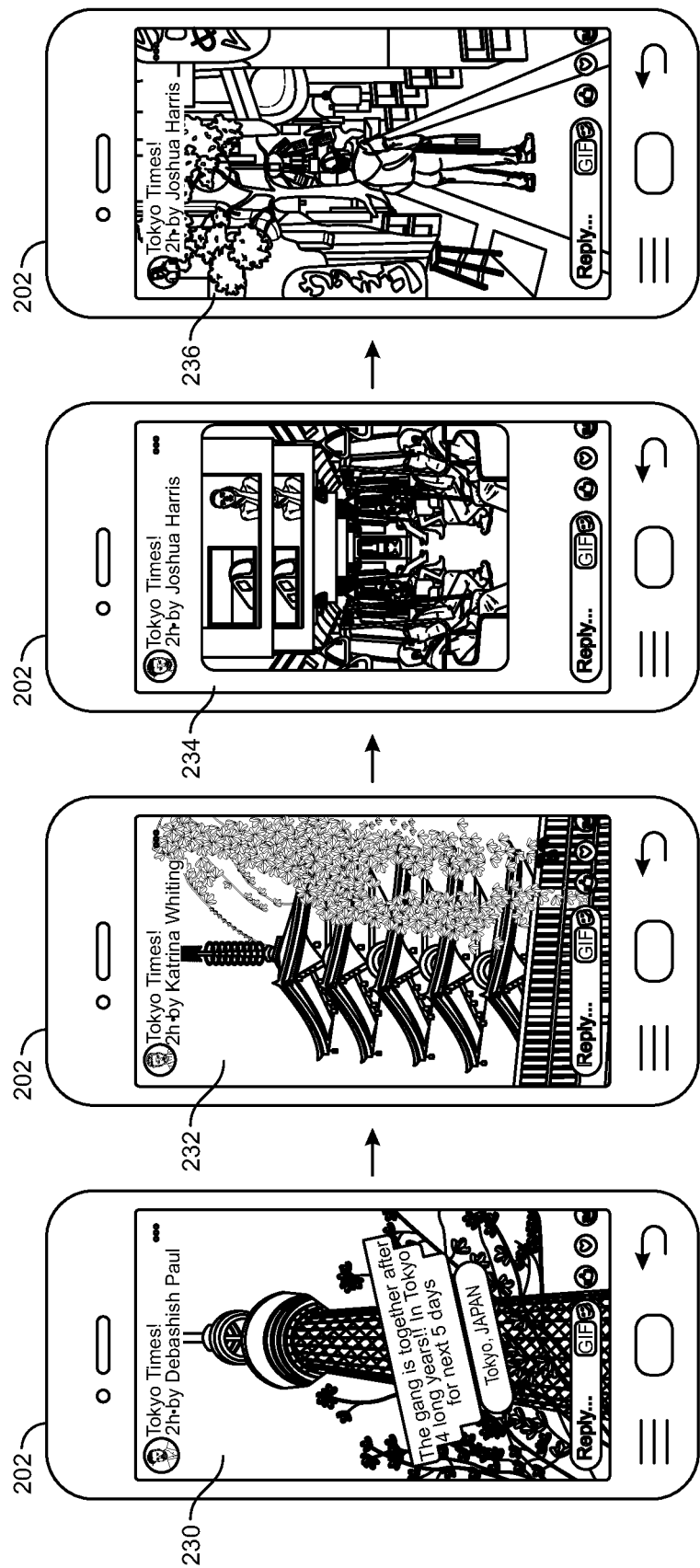
FIG. 7 is an illustration of an exemplary shared story with posts from a variety of different contributors.

For example, FIG. 7 illustrates an exemplary embodiment of shared story 228 being presented to the consumption channel of a user via a user device 700. As shown in FIG. 7, base story composition 230 may be displayed first, followed by story composition 232 created by contributor 220, followed by story composition 234 created by contributor 222, followed by story composition 236 created by contributor 224.

Prior to adding the contributors' story compositions to shared story 228, the disclosed systems and methods may facilitate the creation of the contributors' story compositions and may receive the story compositions from the contributors. A process for facilitating the creation of the contributors' story compositions and receiving the story compositions from the contributors is described in connection with FIGS. 8-14.

Figure 8:
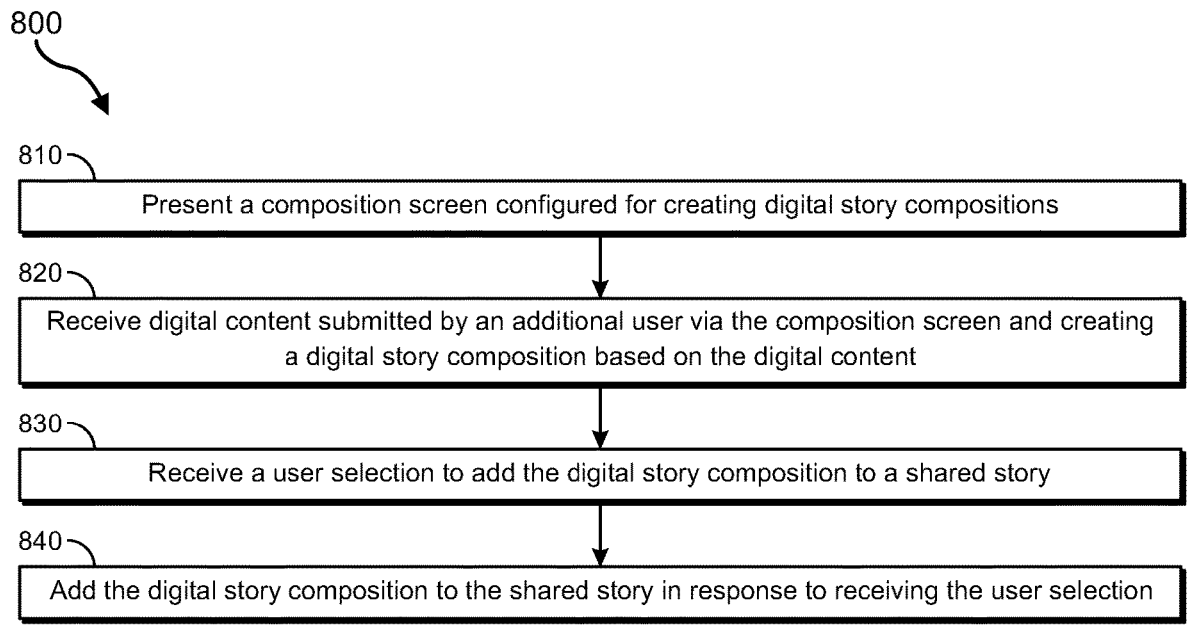
FIG. 8 is a flow diagram of an exemplary method for adding a digital story composition to a shared story.

FIG. 8 is a flow diagram of an exemplary computer-implemented method 800 for generating a contributor story composition. The steps shown in FIG. 8 may be performed by any suitable computer-executable code and/or computing system, such as the systems described herein. In one embodiment, the steps shown in FIG. 8 may be performed by modules operating within a computing device. For example, the steps shown in FIG. 8 may be performed by modules operating in a user device 902 of contributor 220 (e.g., as part of an additional instance of the social media application described above) as shown in exemplary system 900 in FIG. 9.

Figure 9:
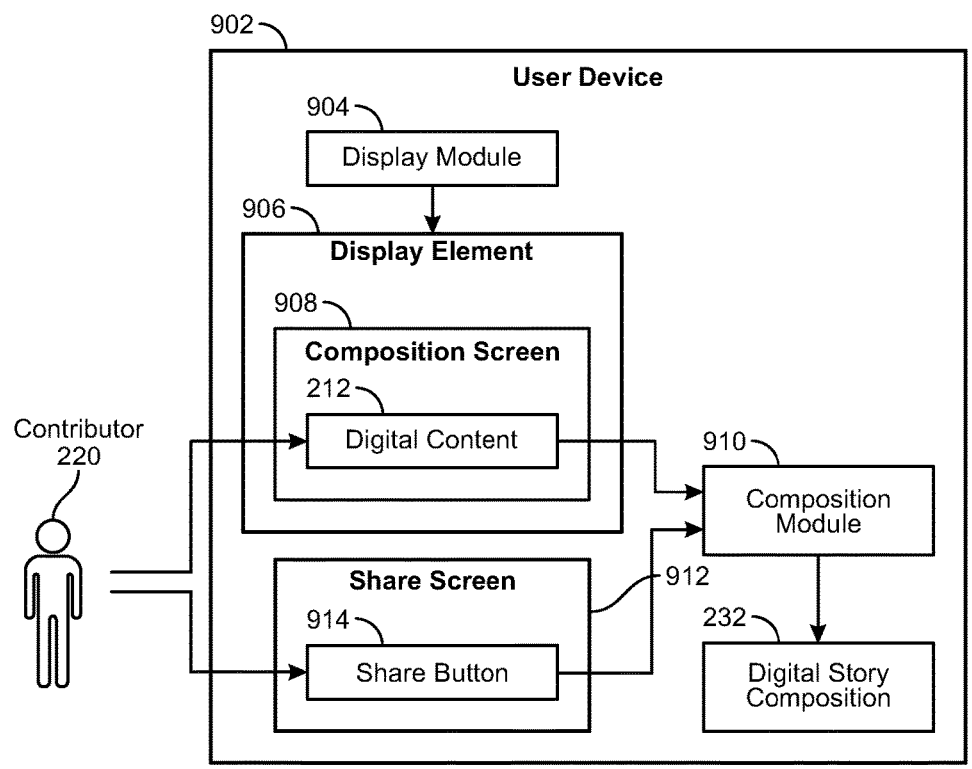
FIG. 9 is a block diagram of an exemplary system used to add a digital story composition to a shared story.

As illustrated in FIG. 8, at step 810, one or more of the systems described herein may present, via a display element of an additional user's computing device, a composition screen configured for creating digital story compositions. For example, as illustrated in FIG. 9, a display module 904 may present, via a display element 906 of user device 902, a composition screen 908.

Composition screen 908 generally represents any type or form of computer-mediated user interface presented via a display element (e.g., by a social media application running on a computing device) that allows a user to create social media compositions. For example, composition screen 908 may allow a user to create a digital story composition to be shared on a stories consumption channel of a social media platform.

Figure 10:
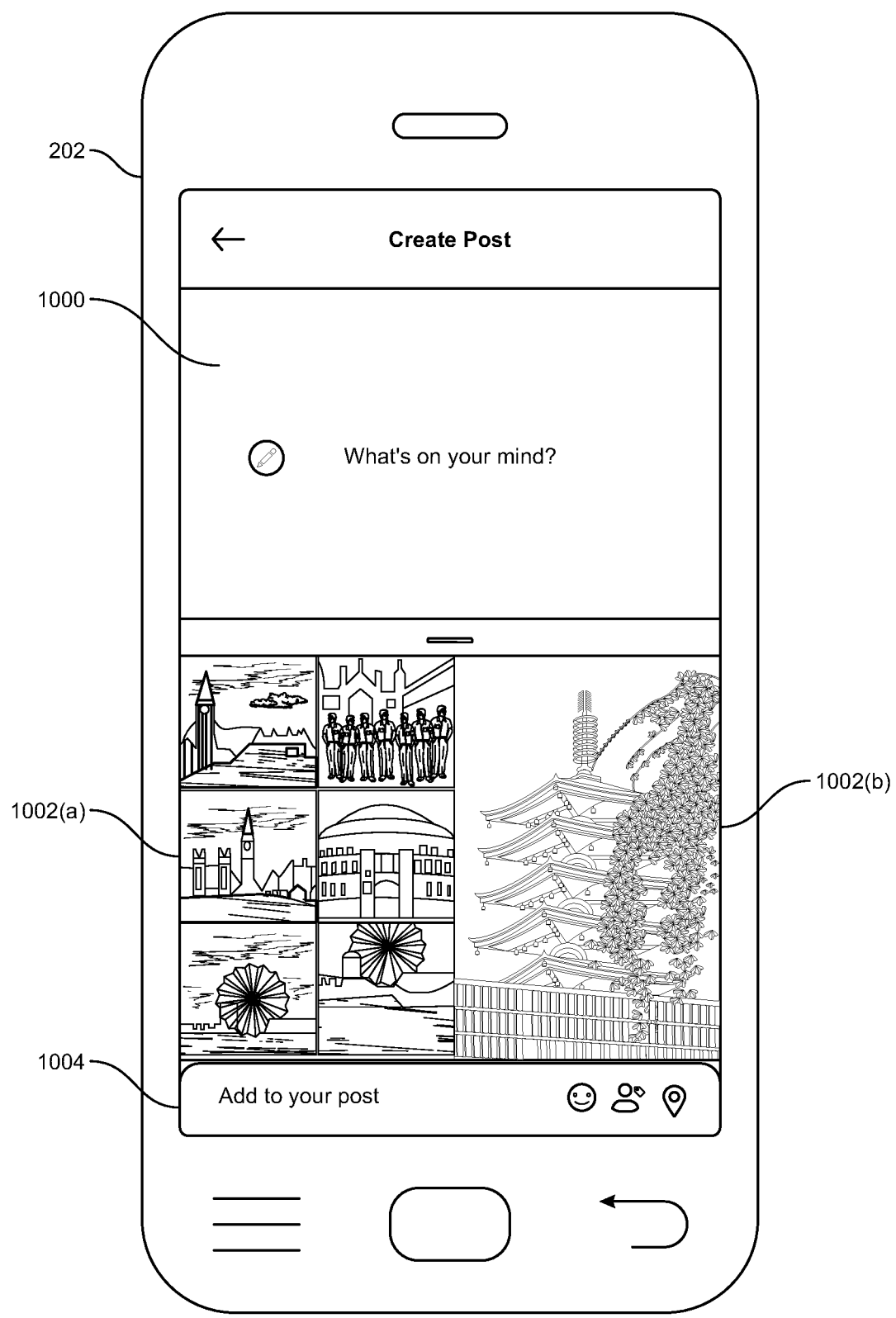
FIG. 10 is an illustration of an additional exemplary composition screen.

Composition screen 212 may include a variety of functional elements. For example, FIG. 10 depicts an exemplary embodiment of composition screen 908 with various digital spaces: a text space 1000, which enables the user to input text (e.g., via a text box), a media space 1002, which enables the user to select and/or upload media items, and a metadata space 1004, which displays one or more selectable metadata items (e.g., digital stickers displaying time, location, friends, and/or feelings information) that may be added to a composition. In some examples, as shown in FIG. 10, composition screen 908 may be configured to receive multiple types of input (text input, media input, and metadata input). In other examples, a composition process may include receiving input from a series of different screens. For example, composition screen 908 may represent a dedicated media screen that receives media input and navigates to additional composition screen for receiving text, metadata, and/or other input.

Figure 11:
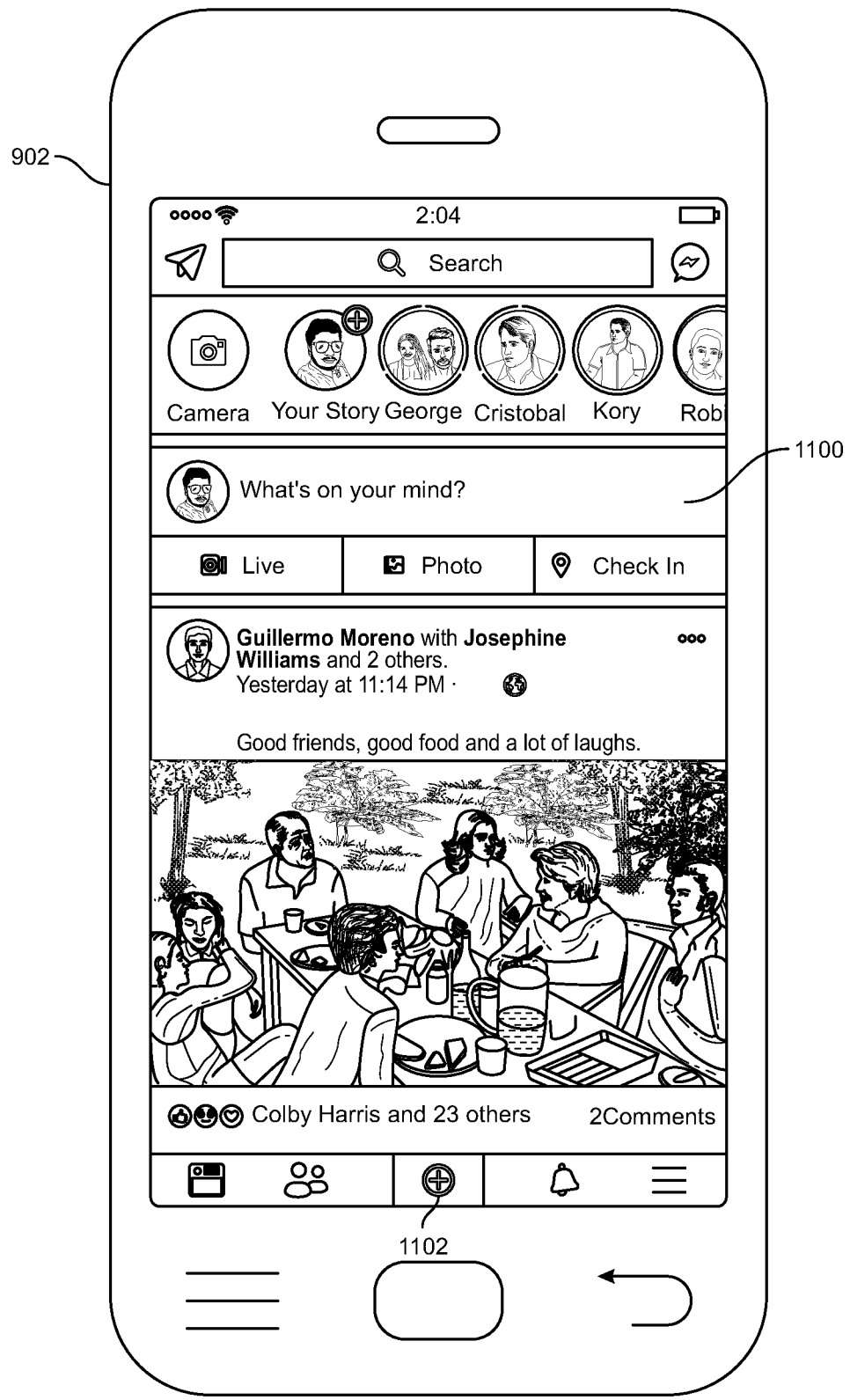
FIG. 11 is an illustration of an exemplary predecessor screen that navigates to an exemplary composition screen.

Display module 904 may present composition screen 908 in response to a variety of triggers. In some examples, display module 904 may automatically present composition screen 908 as an initial welcome screen presented in response to a determination that the user has opened a social media application. In other examples, a non-composition screen, such as a newsfeed screen, may be configured as the initial welcome screen, or a user may wish to transition from a non-composition screen, such as a newsfeed screen or a messenger screen, to a composition screen. In these examples, a predecessor screen may include a text box (e.g., with a prompt such as "What's on your mind?") and composition screen 908 may be retrieved when the text box is selected. Additionally or alternatively, the predecessor screen may include a composition icon which, when selected, triggers the retrieval of composition screen 908. For example, FIG. 11 is an illustration of an exemplary predecessor screen 1100 (a newsfeed screen in this example) with a composition icon 1102 that depicts a glyph of a plus sign, conveying that the user may add a composition to his or her profile by selecting the composition icon.

Returning to FIG. 8, at step 820, one or more of the systems described herein may receive digital content submitted by the additional user via the composition screen and may create a digital story composition based on the content. For example, as illustrated in FIG. 9, a composition module 910 may receive digital content submitted by contributor 220 via composition screen 908 and may create story composition 232 (e.g., as depicted in FIG. 7) based on the content.

In some examples, as depicted by the story compositions (e.g., 232) in FIG. 7, a digital story composition may include a digital image. Additionally, as depicted by base story composition 230 in FIG. 7, a digital story composition may include one or more digital stickers (e.g., a digital text sticker and the digital location sticker as displayed in FIG. 7). In other examples, a digital story composition may represent a text composition. In some such examples, the digital story composition may include a white backdrop with plain text. In other such examples, the digital story composition may represent a Super Awesome Text Post (SATP) in which the backdrop is a color and/or image and the text may also be stylized. In other examples, the digital story composition may represent a graphic.

Returning to FIG. 8, at step 830, one or more of the systems described herein may additionally receive a user selection to add the digital story composition to the shared story. For example, as illustrated in FIG. 9, composition module 910 may receive a user selection of a share button 914 displayed in a share screen 912.

Figure 12:
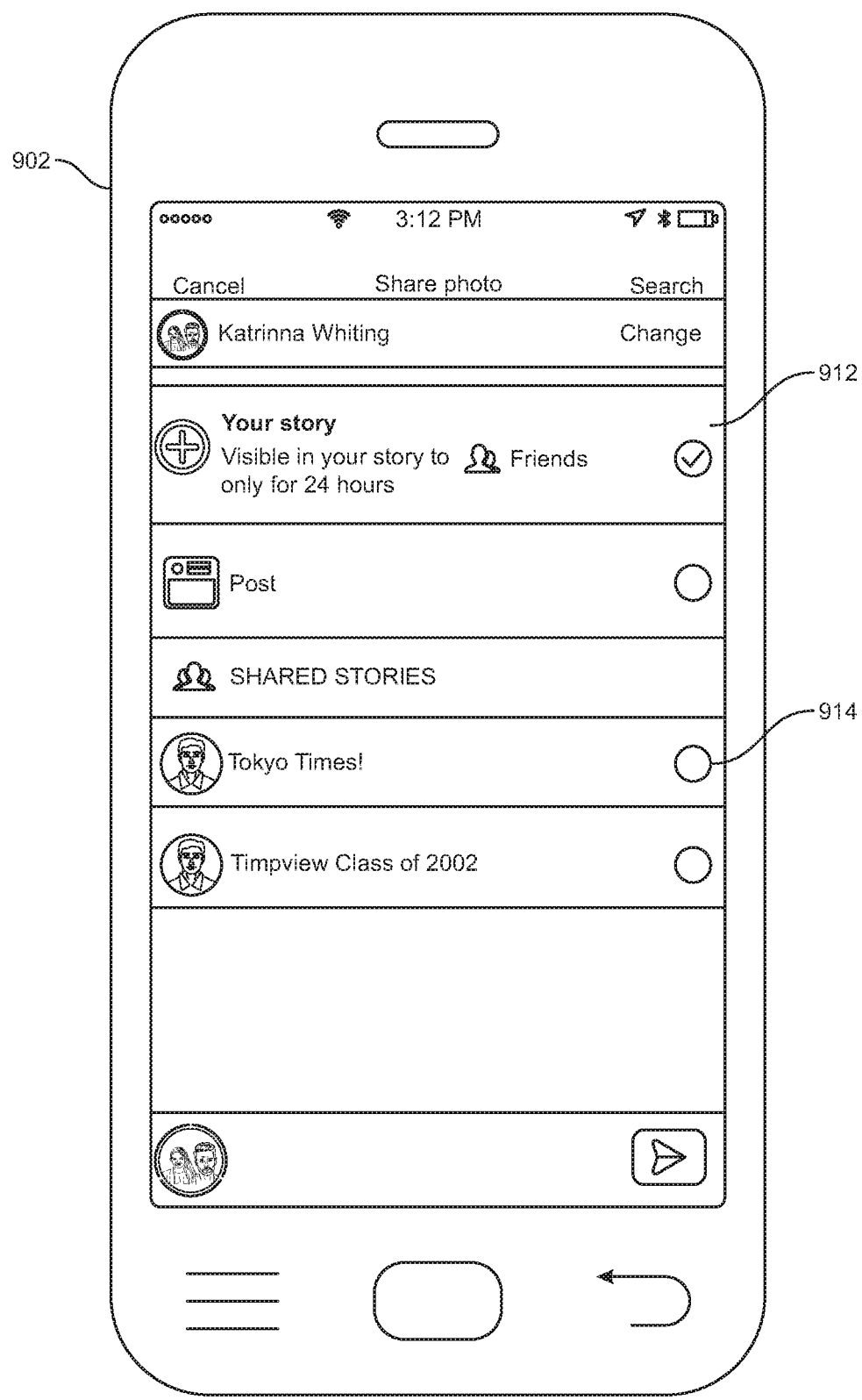
FIG. 12 is an illustration of an exemplary share screen for adding a digital story composition to a shared story.

In some examples, share screen 912 may represent the final composition screen in a series of composition screens. For example, composition screen 908 may navigate to share screen 912 in response to contributor 220 selecting a push button indicating that the user is ready to publish the digital composition created using composition screen 908 (e.g., a "next" push button, a "share" push button, etc.). FIG. 12 illustrates an exemplary embodiment of share screen 912 in which share screen 912 represents a final composition screen. As shown in FIG. 12, the final composition screen may allow contributor 220 to post his or her digital composition to his or her own personal story or to a shared story. In this example, share button 914 may represent a selection of shared story 228 as a channel for publication.

In other examples, a predecessor screen, displayed prior to composition screen 908, may include selectable elements for designating a stories channel for which a user would like to create a digital composition. In these examples, contributor 220 may select an element within the predecessor screen indicating that he or she wishes to create a digital composition to add to shared story 228, prior to composing the digital story composition. In this example, composition screen 908 may include a publish push button that automatically publishes digital story composition to shared story 228 (e.g., without providing options to publish to other story channels). In one embodiment, such a predecessor screen may represent a screen displayed within shared story 228 as the shared story 228 is being consumed. For example, contributor 220 may be viewing shared story 228 via his or her stories consumption channel and may select a push button included within shared story 228 inviting contributor 220 to add to shared story 228.

Finally, at step 840 in FIG. 8, one or more of the systems described herein may add the additional user's digital story composition to the shared story in response to receiving the user selection. For example, composition module 910 may add story composition 232 to shared story 228 in response to contributor 220 selecting share button 914.

Figure 13:
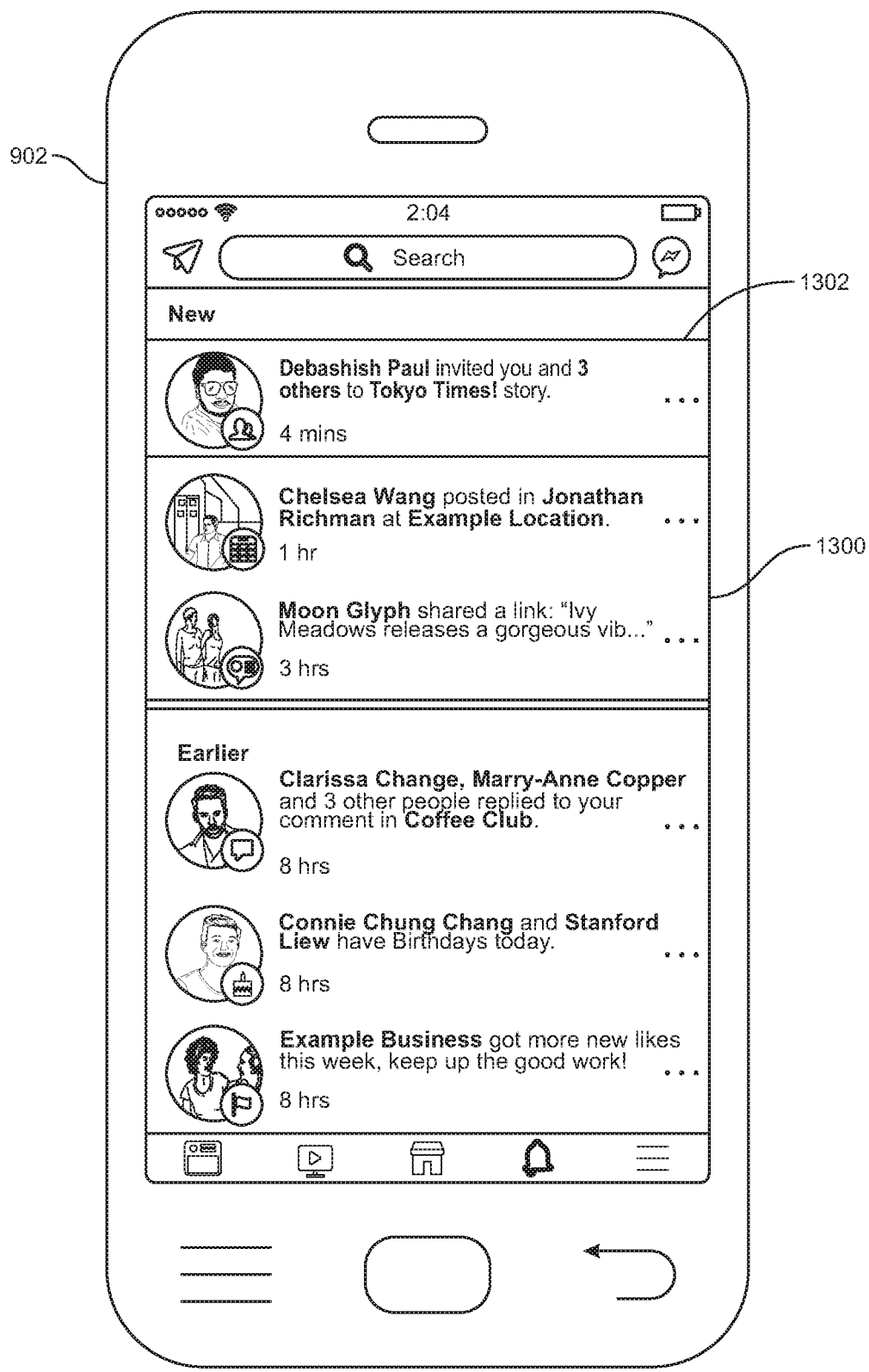
FIG. 13 is an illustration of an exemplary notification screen for notifying a user that he or she has been added as a contributor to a shared story.

In some examples, contributor 220 (along with each of the other contributors) may have been presented with a contributor landing screen after having been invited to join shared story 228 as a contributor. In one embodiment, the contributor landing screen may be presented in response to contributor 220 digitally accepting an invitation to be added as a contributor to shared story 228. In another embodiment, the contributor landing screen may be presented in response to contributor 220 selecting a notification informing contributor 220 of having been added as a contributor to shared story 228. For example, FIG. 13 is an exemplary embodiment of a notification screen 1300 with a notification 1302 of having been invited to contribute to a shared story. In this example, a contributor landing screen may be presented to contributor 220 in response to receiving user input selecting notification 1302.

Figure 14:
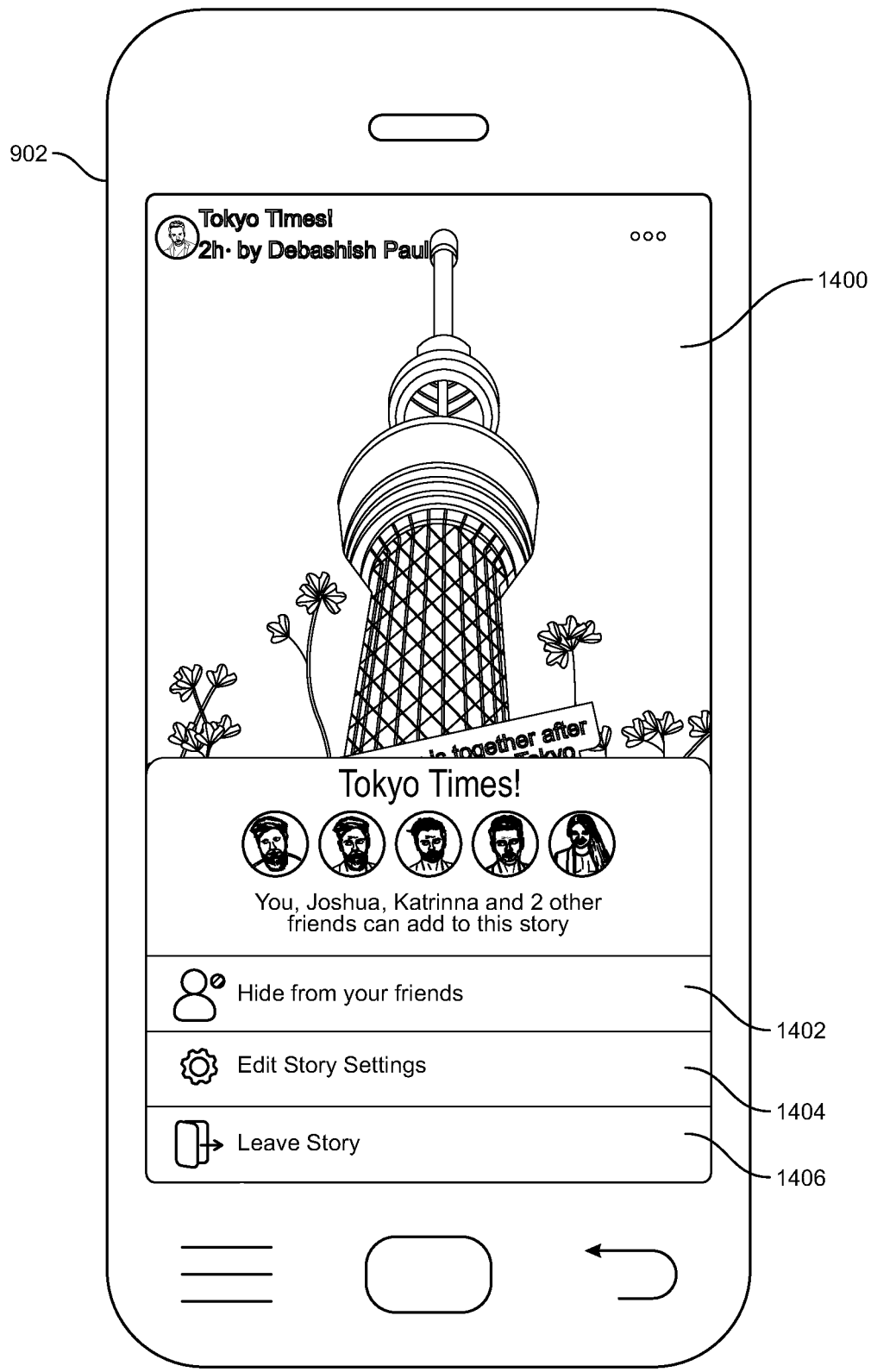
FIG. 14 is an exemplary contributor landing screen presented to a contributor of a shared story.

The contributor landing screen may include a variety of elements, as illustrated in FIG. 14. FIG. 14 depicts a contributor landing screen 1400 with various elements: a privacy element 1402, a settings element 1404, and an exit element 1406. Each of these elements will be described, in turn.

First, privacy element 1402 may allow contributor 222 to modify the permission settings selected by producer 210. For example, in embodiments in which producer 210 selected a public setting for shared story 228 (i.e., to share shared story 228 with contributors and with friends of the contributors), privacy element 1402 may, when selected, hide the shared story 228 from the friends of contributor 222. Next, settings element 1404 may allow contributor 222 to edit one or more additional settings of shared story 228 selected by contributor 222 (e.g., a time frame for which shared story 228 will remain live). Finally, exit element 1406 may, when selected, remove contributor 220 as a contributor to shared story 228.

Once shared story 228 has been published (i.e., becomes "live" in the consumption channels of users with permission to view shared story 228), shared story 228 may remain live for a designated amount of time. In one embodiment, shared story 228 may remain live until a predetermined amount of time (e.g., 24 hours) has passed without a new digital story composition being added by any of the contributors to shared story 228. After the predetermined amount of time passes without any new digital story compositions being added, shared story 228 may be removed from the stories consumption channels of users who had permission to view shared story 228. In one embodiment, shared story 228 may be archived and may continue to be accessible to the contributors of shared story 228 (e.g., producer 210 and contributors 220-224).

As described throughout the instant disclosure, the disclosed systems and methods may provide a social networking platform in which a producer may invite other users to participate in a shared story. The shared story may include a collection of individual story compositions created by individual contributors. The individual story compositions may be added to the shared story as they are created. After a designated amount of time (e.g., 24 hours) has passed without a new composition being added to the shared story, the shared story may expire and be removed from the consumption channels of users with permission to view the shared story. Once the shared story expires, the shared story may continue to be maintained in an archive which may only be accessible to the shared story's contributors.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input and transform the user input into a digital social media composition. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    receiving, via an instance of a social media application running on a user's computing device:
        a first user input initiating the creation of a shared story configured to include individual story compositions from a plurality of different contributors; and
        a second user input selecting one or more members of a social media platform associated with the social media application as contributors to the shared story, wherein:
            the second user input is received via a contributor space of a screen, provided via the social media application, that enables the selection of the one or more members as contributors; and
            the contributor space comprises a default list of contributors, the default list comprising a list of members identified, using facial recognition, in an image captured by a capture screen on the user's computing device;
    creating the shared story with the selected members as contributors; and
    adding, to the shared story, a digital story composition created by an additional user who was selected as a contributor via the second user input.

2. The computer-implemented method of claim 1, further comprising:
    providing, via a display element of the user's computing device, a composition screen that may be used to create a social media composition; and
    presenting, within the composition screen, a selectable element that may be selected to create a shared story, wherein the first user input comprises a selection of the selectable element.

3. The computer-implemented method of claim 1, wherein:
    the screen comprises an inaugural landing screen for creating new shared stories; and
    the method further comprises, in response to receiving the first user input, presenting the inaugural landing screen via a display element of the user's computing device.

4. The computer-implemented method of claim 3, wherein:
    the inaugural landing screen comprises a plurality of spaces with selectable elements, including, in addition to the contributor space, at least one of:
        a profile picture space that allows the user to select a profile picture for the shared story;
        a privacy space that allows the user to select a privacy setting; and
        a story start space that allows the user to initiate the shared story; and.

5. The computer-implemented method of claim 4, wherein the profile picture space comprises a default profile picture and allows the user to accept the default profile picture or select a new profile picture.

6. The computer-implemented method of claim 5, wherein the default profile picture comprises at least one of:
    a collage of contributor pictures comprising a picture of each contributor; or
    an image most recently captured by the capture screen prior to receiving the first user input.

7. The computer-implemented method of claim 6, wherein the image from which the list of members is identified comprises the image most recently captured by the capture screen.

8. The computer-implemented method of claim 4, wherein the privacy space comprises a binary privacy button that allows the user to toggle between two privacy settings consisting of:
    a setting to limit access to the shared story to only contributors who have been invited to the shared story; and
    a setting to limit access to the shared story to the contributors who have been invited to the shared story and to friends of the contributors who have been invited to the shared story.

9. The computer-implemented method of claim 1, further comprising presenting a contributor landing screen to the additional user via an additional instance of the social media application running on the additional user's computing device.

10. The computer-implemented method of claim 9, further comprising:

in response to receiving the second user input, transmitting a digital invitation to the additional instance of the social media application inviting the additional user to participate as a contributor to the shared story; and receiving, via the additional user's computing device, user input accepting the digital invitation, wherein presenting the contributor landing screen comprises presenting the contributor landing screen in response to receiving the user input accepting the digital invitation.

11. The computer-implemented method of claim 9, wherein the contributor landing screen comprises a plurality of selectable elements, including at least one of:

a privacy element that, when selected, allows the additional user to hide the shared story from his or her friends on the social media platform;

a settings element that, when selected, allows the additional user to edit one or more settings of the shared story; and an exit element that, when selected, allows the additional user to initiate being removed as a contributor to the shared story.

12. The computer-implemented method of claim 1, further comprising maintaining the shared story as a live story until a predetermined amount of time has passed without a new digital story composition being added by any of the shared story's contributors.

13. The computer-implemented method of claim 1, wherein creating the shared story comprises at least one of:

creating a shared story container to which digital story compositions created by the contributors may be added; or publishing one or more digital story compositions of the shared story via a stories channel of the social media platform.

14. The computer-implemented method of claim 1, wherein adding the additional user's digital story composition to the shared story comprises:

presenting, via a display element of the additional user's computing device, a composition screen configured for creating digital story compositions;

receiving digital content submitted by the additional user via the composition screen and creating the digital story composition based on the digital content;

additionally receiving a user selection to add the digital story composition to the shared story; and adding the additional user's digital story composition to the shared story in response to receiving the user selection.

15. A system comprising:

a receiving module, stored in memory, that receives, via an instance of a social media application running on a user's computing device:

a first user input initiating the creation of a shared story configured to include individual story compositions from a plurality of different contributors; and a second user input selecting one or more members of a social media platform associated with the social media application as contributors to the shared story, wherein:

the second user input is received via a contributor space of a screen, provided via the social media application, that enables the selection of the one or more members as contributors; and the contributor space comprises a default list of contributors, the default list comprising a list of members identified, using facial recognition, in an image captured by a capture screen on the user's computing device;

a creation module, stored in memory, that:

creates the shared story with the selected members as contributors; and adds, to the shared story, a digital story composition created by an additional user who was selected as a contributor via the second user input; and at least one physical processor configured to execute the receiving module and the creation module.

16. The system of claim 15, wherein the creation module further:

provides, via a display element of the user's computing device, a composition screen that may be used to create a social media composition; and presents, within the composition screen, a selectable element that may be selected to create a shared story, wherein the first user input comprises a selection of the selectable element.

17. The system of claim 15, wherein:

the screen comprises an inaugural landing screen for creating new shared stories; and in response to the receiving module receiving the first user input, the creation module presents the inaugural landing screen via a display element of the user's computing device.

18. The system of claim 17, wherein:

the inaugural landing screen comprises a plurality of spaces with selectable elements, in addition to the contributor space, including at least one of:

a profile picture space that allows the user to select a profile picture for the shared story;

a privacy space that allows the user to select a privacy setting; and a story start space that allows the user to initiate the shared story.

19. The system of claim 15, wherein the creation module further presents a contributor landing screen to the additional user via an additional instance of the social media application running on the additional user's computing device.

20. A non-transitory computer-readable medium comprising one or more computer-readable instructions that, when executed by at least one processor of a computing device, cause the computing device to:

receive, via an instance of a social media application running on a user's computing device:

a first user input initiating the creation of a shared story configured to include individual story compositions from a plurality of different contributors; and a second user input selecting one or more members of a social media platform associated with the social media application as contributors to the shared story, wherein:

the second user input is received via a contributor space of a screen, provided via the social media application, that enables the selection of the one or more members as contributors; and the contributor space comprises a default list of contributors, the default list comprising a list of members identified, using facial recognition, in an image captured by a capture screen on the user's computing device;

create the shared story with the selected members as contributors; and add, to the shared story, a digital story composition created by an additional user who was selected as a contributor via the second user input.

* * * * *